(12) United States Patent
Schütz et al.

(10) Patent No.: US 7,745,560 B2
(45) Date of Patent: Jun. 29, 2010

(54) LUBRICANT FOR SPORTS EQUIPMENT

(75) Inventors: Markus Schütz, Stuttgart (DE); Holger Bender, Backnang (DE); Florian Felix, Garmisch-Partenkirchen (DE)

(73) Assignee: Holmenkol AG, Ditzingen-Heimerdingen (DE)

( * ) Notice: Subject to any disclaimer, the term of this patent is extended or adjusted under 35 U.S.C. 154(b) by 513 days.

(21) Appl. No.: 11/573,674

(22) PCT Filed: Aug. 10, 2005

(86) PCT No.: PCT/EP2005/008698

§ 371 (c)(1),
(2), (4) Date: Feb. 13, 2007

(87) PCT Pub. No.: WO2006/018210

PCT Pub. Date: Feb. 23, 2006

(65) Prior Publication Data

US 2007/0225179 A1    Sep. 27, 2007

(30) Foreign Application Priority Data

Aug. 13, 2004  (DE) ................. 10 2004 039 409

(51) Int. Cl.
*C08G 77/24*   (2006.01)
(52) U.S. Cl. ................... 528/42; 508/110; 528/10
(58) Field of Classification Search .......... None
See application file for complete search history.

(56) References Cited

U.S. PATENT DOCUMENTS

| | | | | |
|---|---|---|---|---|
| 3,997,496 | A | * | 12/1976 | Razzano ............... 528/18 |
| 4,157,337 | A | * | 6/1979 | Evans ................ 556/462 |
| 4,729,794 | A | | 3/1988 | Rosenberg |
| 4,828,885 | A | * | 5/1989 | Rosenberg ............ 427/387 |
| 5,445,751 | A | * | 8/1995 | Kanzaki et al. ........ 508/201 |
| 6,114,448 | A | * | 9/2000 | Derbes ................ 525/104 |
| 6,197,989 | B1 | * | 3/2001 | Furukawa et al. ....... 556/450 |
| 6,358,893 | B1 | | 3/2002 | Zechman, III et al. |

FOREIGN PATENT DOCUMENTS

| | | |
|---|---|---|
| DE | 1 964 544 | 8/1970 |
| EP | 0 444 752 | 2/1991 |
| EP | 0 527 286 A1 | 2/1992 |
| GB | 755 794 | 8/1956 |
| JP | 03193072 A | 8/1991 |
| WO | 89/10950 | 11/1989 |
| WO | 97/27004 | 7/1997 |

* cited by examiner

*Primary Examiner*—Kuo-Liang Peng
(74) *Attorney, Agent, or Firm*—Perman & Green LLP

(57) ABSTRACT

The invention relates to modified silicone polymers for improving the gliding properties of sports equipment, to compositions containing the same, and to their use for this purpose. The silicone polymers are, above all, alkyl-modified silicone polymers which comprise at least one hydrocarbon group having 16 to 18 carbon atoms, and/or organofunctionalized silicone polymers which comprise at least one functionalized hydrocarbon group having 1 to 10 carbon atoms.

17 Claims, No Drawings

LUBRICANT FOR SPORTS EQUIPMENT

This application is the National Stage of International Application No. PCT/EP2005/008698, International Filing Date, 10 Aug. 2005, which designated the United States of America, and which international application was published under PCT Article 21(2) as WO Publication No. WO 2006/018210 A1 and which claims priority from German Application No. 10 2004 039 409.1, filed 13 Aug. 2004.

The invention relates to agents for improving the gliding properties of sports equipment, for example winter sports equipment, such as ski, compositions which contain the same, and their use for this purpose. More particularly it relates to modified silicone polymers as lubricants.

Not only in professional sports, but also among ambitious amateurs there is a constant need for lubricants which can still improve the gliding effects of sports equipment, such as skis, and which lead to, e.g., still higher top speeds and still better accelerations.

In the prior art numerous materials for improving the gliding properties of sports equipment, e.g. cross-country skis, alpine skis, and snowboards, were already proposed. These materials are usually paraffin waxes, fluorinated waxes or fluorinated polymers, which can also contain additives (cf., e.g., WO 89/10950, EP 0 444 752, EP 1 009 544).

The gliding surfaces of winter sports equipment usually consist of sintered thermoplasts, and in particular of polyethylene, having a high density and a high molecular weight, such as UHWPE, or of extruded polymers.

These lubricants are usually melted onto the gliding surfaces in a hot environment, e.g. by means of an iron. In this connection there is the risk that when the waxes are applied the polyethylene soles of the skis are damaged, since the melting point of polyethylene is minimally higher than the melting points of the waxes and of the polymers.

The waxes can also be worked in into various formulations and be applied in the form of so-called liquid waxes without the influence of heat. Coatings based on such solutions, however, are often not very resistant and have to be frequently renewed.

In the case of conventional waxes the selection of the appropriate wax and/or of the additives to be used decisively depends on the snow properties. Mostly it is therefore necessary to select the wax according to need and/or to add additives to the wax in order to obtain optimal gliding properties at given snow conditions. This is, however, often difficult, above all for users having little experience.

Indeed, in the prior art there have been known universal waxes which yield good gliding properties at different snow conditions; these waxes are, however, not completely satisfying.

In the prior art there have also been known ski waxes on the basis of siloxane. In U.S. Pat. No. 4,828,885 and U.S. Pat. No. 4,729,794 ski wax compositions were described which contain a straight-chain or cyclic non-volatile dimethylsiloxane. The publication GB 755 794 relates to wax compositions which contain a methylpolysiloxane or methylphenylpolysiloxane.

The European patent application EP 527 286 discloses lubricants which can also be used as, e.g., ski wax, which contain a siloxane copolymer modified with a hydrocarbon group, this hydrocarbon group containing at least 24 carbon atoms.

It is the object of the present invention to overcome the mentioned disadvantages and to indicate lubricants which—independently of the snow properties—can still improve the gliding properties of winter sports equipment and, at the same time, are easy to apply without the absolute necessity of applying them at high temperatures, and which well adhere to the sole.

For sports equipment which is usually employed in water, e.g. water skis, speedboats or swimwear, it would also be desirable in a similar way to apply a lubricant onto the respective surfaces in order to still improve the gliding properties and, thus, the speed which can be achieved. This applies in the same way to the gliding properties of sporting equipment associated with air, e.g. canvas, paragliders, or ultralights.

The invention therefore relates to modified silicone polymers as lubricants for sports equipment and, in particular, for winter sports equipment, which are selected among the alkyl-modified silicone polymers which contain at least one long-chain hydrocarbon group with 16 to 18 carbon atoms, and the organofunctionalized silicone polymers which contain at least one functionalized hydrocarbon group.

The hydrocarbon group(s) of the alkyl-modified silicone polymers can be straight-chained or branched, saturated or unsaturated. They can possibly also have one or more substituents which are selected, for example, among the halogen atoms, e.g., fluorine or chlorine, hydroxy, carboxy, or amino.

The organofunctionalized silicone polymers contain at least one functionalized hydrocarbon group which comprises a functional group and, in particular, one or a plurality of halogen atoms and, especially, fluorine atoms. Also the functionalized hydrocarbon groups of the organofunctionalized silicone polymers can be saturated or unsaturated, straight-chained or branched. The functionalized group(s) can be, in particular, halogenated and, especially, fluorinated groups. The groups can also be perfluorinated.

As especially preferred example the 3,3,3-trifluoropropyl group can be mentioned.

The silicone polymers can be homo- or copolymers and they can be straight-chained, branched or cyclic.

Preferred modified silicone polymers according to the present invention are the homo- or copolymers of the following formula (I):

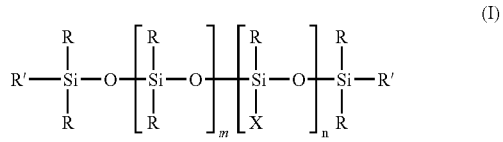

wherein
the groups R, which are identical or different, are straight-chained or branched alkyl groups of 1 to 10 carbon atoms or phenyl groups, preferably at least 80% of the groups R, and still more preferably, all groups R being methyl,
the groups R', which are identical or different, are hydrogen, alkyl having 1 to 10 carbon atoms, phenyl, vinyl or hydroxy;
the group X is an alkyl group having 16 to 50 carbon atoms or a halogenated alkyl group having 1 to 10 carbon atoms, preferably a fluorinated alkyl group having 1 to 10 carbon atoms,
m is 0 or an integer from 1 to 50, preferably from 0 to 15, and especially preferably from 0 to 10,
n is an integer from 1 to 20, preferably from 1 to 5, and especially preferably from 1 to 3.

According to the invention the group X is preferably a straight-chained halogenated alkyl group and, especially, the 3,3,3-trifluoropropyl group.

According to the invention those modified silicone polymers are especially preferred which are liquid at ambient temperature; especially preferred modified silicone polymers have a viscosity in the range from 10,000 to 30,000 cst, the viscosity being measured at 25° C. (77° F.). Such modified silicone polymers lead to an especially significant improvement of the gliding properties. These polymers have the further advantage that they can be applied to the surface of the respective sports article especially easily without a heating being necessary. The lubricants can, e.g., easily be rubbed thereon with a cloth or sponge or can possibly be applied as aerosols, e.g., by means of aerosol containers or pump bottles.

These lubricants according to the invention can be applied in their pure form, but they can also contain additives or can possibly be used in a mixture together with further lubricants or solvents. In the case of winter sports equipment they can also be worked in into conventionally used lubricants, such as paraffin waxes or fluorinated waxes, or, e.g. in the case of boats, they can be introduced into the varnish layer used for the coating.

E.g. compositions can be used which, in combination with the modified silicone polymers according to the invention, contain 0.1 to 98% by weight customary paraffin waxes and/or fluorinated waxes. The modified silicone polymers according to the invention account for preferably 2-30% by weight, and more preferably for 5-20% by weight of the overall weight of the lubricant. Namely, surprisingly it turned out that customary paraffin waxes and/or fluor waxes which contain the modified silicone polymers according to the invention in the mixture lead to significantly better gliding properties on the snow than do the known paraffin waxes and/or fluor waxes alone.

The modified silicone polymers according to the invention can also be used together with solvents, especially if the silicone polymers are viscous or wax-like and have a relatively high molecular weight.

Suitable solvents are silicone oils, e.g. cyclopentasiloxane or cyclomethicone, liquid hydrocarbons, e.g. ISOPARs, alcohols, e.g. isopropanol and ethanol. Preferably silicone oils are used.

According to the invention it is also possible to apply the modified silicone polymers on a conventional ski wax film, i.e. a lubricant layer serving as a base wax. The modified silicone polymers according to the invention can, however, be directly applied to the gliding surface without applying a base wax beforehand.

It is especially preferable to first apply a modified silicone polymer according to the invention directly on the sole and, subsequently, to apply a further conventional lubricant, e.g. a fluorinated wax or paraffin wax. In this way not only the gliding properties can be improved, but also the abrasion resistance can be increased and the adhesion improved, so that the lubricant must be reapplied only at times.

Moreover, the silicone polymers modified according to the invention have the advantage that they are chemically inert and healthwise unobjectionable and, therefore, no special safety measures must be taken when the lubricant is applied.

Alkyl-modified silicones which are especially preferable according to the invention are the alkyl-modified polydimethylsiloxanes which comprise one or a plurality of alkyl chains having 16 to 18 or 30 to 45 carbon atoms or mixtures of such chains.

Especially preferable organofunctionalized silicone polymers are the copolymers of trifluoropropylmethyl/dimethylsiloxane which have terminal vinyl or hydroxy groups.

The modified silicone polymers according to the invention can improve the gliding properties of most various sports equipment. As examples, in particular skis, cross-country skis, snowboards, sleds, boats, surfboards, waterskis, sailplanes, paragliders or ultralights can be mentioned.

In the following examples are given for explaining the invention in more detail.

EXAMPLE 1

According to the following test the gliding properties of cross-country skis were ascertained, for which test one pair of skis was treated with a lubricant according to the invention and one pair of skis was treated with a lubricant of the prior art.

Two identical pairs of skating skis were first subjected to a basic treatment by using Betamix Worldcup RED of the company Holmenkol. For this purpose the wax was molten onto the skis by means of a wax iron, scraped off by a plastic blade and then brushed. Betamix Worldcup RED is a paraffin wax without fluorinated components.

Onto this surface the respective wax mixtures to be tested were applied. The one pair of skis was again coated with Betamix Worldcup RED of the company Holmenkol (Comparative Example). The other pair of skis was waxed with an alkyl-modified silicone polymer according to the invention having a long alkyl chain (16-18 carbon atoms). In both cases the wax was applied to the skis by a wax iron, then the excess wax was scraped off with a plastic blade and, subsequently, the ski sole was brushed with a SteelMicro Finish Brush.

The test was made on a prepared sloping cross-country trail. The times needed for a pregiven distance were detected by means of a light barrier. Per pair of skis alternatingly three test runs were made, and all runs were made by the same skier.

Conditions During the Tests:

| | |
|---|---|
| weather: | overcast, rain |
| air temperature: | 6.2° C. (43.16° F.) |
| snow temperature: | −0.7° C. (30.74° F.) |
| atmospheric humidity: | 72.5% |
| type of snow | old snow coarse (grain size 1.5 mm) |
| trail: | wet soft |

The result is summarized in the following Table, from the detected times the mean values having been calculated, respectively.

| | mean value [s] | distance [%] |
|---|---|---|
| alkyl-modified silicone polymer according to the invention | 6.53 | — |
| Holmenkol Betamix Worldcup RED | 6.56 | 0.46% |

Therefore, with the alkyl-modified silicone polymer according to the invention the time needed could be reduced by 0.46%.

EXAMPLE 2

This Example shows the improvement of the gliding properties which can be achieved with a lubricant composition according to the invention as compared to a lubricant of the prior art.

Identical skating skis were first subjected to a basic treatment by using Betamix Worldcup RED of the company Holmenkol. For this purpose the wax was molten onto the skis by a wax iron, scraped off by a plastic blade and then brushed.

On this base coat the respective wax mixtures to be tested were applied: H7 Yellow of the company Briko (Comparative Example) resp. a mixture of 80% by weight NordicGlider SF 0/2 of the company Holmenkol and 20% by weight of an alkyl-modified silicone polymer having a long alkyl chain (16-18 carbon atoms). In the following this mixture is called Test Mixture A.

In both cases the wax was applied by a wax iron, then the excess wax was scraped off with a plastic blade and, thereupon, the ski sole was brushed with a SteelMicro Finish Brush. H7 Yellow as well as NordicGlider SF 0/2 are products containing perfluoroalkane and are used in practice at ski races.

The test was conducted on a prepared sloping trail. The times needed for a predetermined distance were detected by a light barrier. Per pair of skis alternatingly three test runs were made, and all runs were made by the same skier.

Conditions During the Test:

| weather: | sunny |
|---|---|
| air temperature: | −1.0° C. (30.2° F.) |
| snow temperature: | −4.9° C. (23.18° F.) |
| amospheric humidity: | 43.6% |
| type of snow | old snow fine (grain size 1 mm) |
| trail: | dry solid |

The result is summarized in the following Table, from the detected times the mean values having been calculated, respectively.

|  | mean value [s] | distance [%] |
|---|---|---|
| Test Mixture A | 12.42 | — |
| Briko H7 Yellow | 12.45 | 0.30% |

The skis waxed with Test Mixture A were faster by about 0.30%.

The invention claimed is:

1. A method of using a lubricant for improving the gliding properties of sports equipment comprising:
   providing a lubricant for sports equipment, which comprises at least one modified silicone polymer, wherein the modified silicone polymer is at least one alkyl-modified silicone polymer which comprises at least one saturated or unsaturated, straight-chain or branched hydrocarbon group having 16 to 18 carbon atoms, and/or at least one organofunctionalized silicone polymer which comprises at least one straight-chain or branched, saturated or unsaturated fluorinated hydrocarbon group having 1 to 10 carbon atoms; and
   applying said lubricant to the surface of the sports equipment
   wherein the lubricant contains:
     70-98% by weight of one or a plurality of paraffin waxes and/or fluor waxes,
     2-30% by weight of one or a plurality of modified silicone polymers.

2. Method according to claim 1, wherein the modified silicone polymers are selected among the following compounds of formula (I):

$$R'-\underset{\underset{R}{|}}{\overset{\overset{R}{|}}{Si}}-O-\left[\underset{\underset{R}{|}}{\overset{\overset{R}{|}}{Si}}-O\right]_m\left[\underset{\underset{X}{|}}{\overset{\overset{R}{|}}{Si}}-O\right]_n\underset{\underset{R}{|}}{\overset{\overset{R}{|}}{Si}}-R' \quad (I)$$

wherein:
  the groups R, which are identical or different, are straight-chained or branched alkyl groups having 1 to 10 carbon atoms or phenyl groups;
  the groups R', which are identical or different, are hydrogen, alkyl having 1 to 10 carbon atoms, phenyl, vinyl or hydroxyl;
  the group X is an alkyl group having 16 to 18 carbon atoms, or a fluorinated alkyl group having 1 to 10 carbon atoms;
  m is 0 or an integer from 1 to 50;
  n is an integer from 1 to 20.

3. Method according to claim 1, wherein the organofunctionalized silicone polymer is a copolymer of trifluoropropylmethyl/dimethylsiloxane.

4. Method according to claim 1, wherein the lubricant further comprises solvents.

5. Method according to claim 4 for improving the gliding properties of sports equipment in water, wherein the sports equipment is selected from the group consisting of boats, surfboards, water skis and swim wear.

6. Method according to claim 5, wherein the lubricant comprises a solvent (a viscosity modifier), which is selected from silicon oils.

7. Method according to claim 6, wherein the solvent is selected from the group consisting of cyclopentasiloxane and cyclomethicone.

8. Method according to claim 1 for improving the gliding properties of winter sports equipment on snow, the lubricant being applied to the not pretreated sole of a winter sports article or to the sole of a winter sports article which has been pretreated with a further lubricant or the lubricant being applied in a mixture with a further lubricant to the sole of a winter sports article.

9. Method according to claim 1, wherein the lubricant further comprises one or more viscosity modifiers.

10. A method of using a lubricant for improving the gliding properties of sports equipment comprising:
   providing a lubricant for sports equipment, which comprises at least one modified silicone polymer, wherein the modified silicone polymer is at least one alkyl-modified silicone polymer which comprises at least one saturated or unsaturated, straight-chain or branched hydrocarbon group having 16 to 18 carbon atoms, and/or at least one organofunctionalized silicone polymer which comprises at least one straight-chain or branched, saturated or unsaturated fluorinated hydrocarbon group having 1 to 10 carbon atoms; and
   applying said lubricant to the surface of the sports equipment,
   wherein the lubricant contains:
     80-99% by weight of one or a plurality of solvents,
     1-20% by weight of one or a plurality of modified silicone polymers.

11. Method according to claim 10, wherein the modified silicone polymers are selected among the following compounds of formula (I):

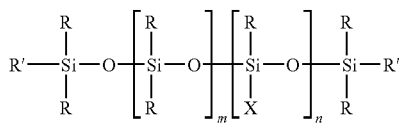 (I)

wherein:
the groups R, which are identical or different, are straight-chained or branched alkyl groups having 1 to 10 carbon atoms or phenyl groups;
the groups R', which are identical or different, are hydrogen, alkyl having 1 to 10 carbon atoms, phenyl, vinyl or hydroxyl;
the group X is an alkyl group having 16 to 18 carbon atoms, or a fluorinated alkyl group having 1 to 10 carbon atoms;
m is 0 or an integer from 1 to 50;
n is an integer from 1 to 20.

12. Method according to claim 10, wherein the organo-functionalized silicone polymer is a copolymer of trifluoropropylmethyl/dimethylsiloxane.

13. Method according to claim 10, wherein the lubricant further comprises conventional paraffin waxes.

14. Method according to claim 13 for improving the gliding properties of sports equipment in water, wherein the sports equipment is selected from the group consisting of boats, surfboards, water skis and swim wear.

15. Method according to claim 10 for improving the gliding properties of winter sports equipment on snow, the lubricant being applied to the not pretreated sole of a winter sports article or to the sole of a winter sports article which has been pretreated with a further lubricant or the lubricant being applied in a mixture with a further lubricant to the sole of a winter sports article.

16. Method according to claim 15, wherein the lubricant comprises a solvent (a viscosity modifier), which is selected from silicon oils.

17. Method according to claim 10, wherein the lubricant further comprises one or more viscosity modifiers.

* * * * *